A. GOODALL.
NON-SKID TIRE PROTECTOR FOR AUTOMOBILES AND OTHER VEHICLES.
APPLICATION FILED JULY 23, 1914.

1,184,175.

Patented May 23, 1916.

WITNESSES:
Grace Goodall
H. H. Staub

INVENTOR
Albert Goodall

UNITED STATES PATENT OFFICE.

ALBERT GOODALL, OF PORTLAND, OREGON.

NON-SKID TIRE-PROTECTOR FOR AUTOMOBILES AND OTHER VEHICLES.

1,184,175. Specification of Letters Patent. Patented May 23, 1916.

Application filed July 23, 1914. Serial No. 852,684.

*To all whom it may concern:*

Be it known that I, ALBERT GOODALL, of Portland, in the county of Multnomah and State of Oregon, have invented a new and useful Improvement in Non-Skid Tire-Protectors for Automobiles and other Vehicles of This Class Having Rubber Tires, of which the following is a complete description, reference being had to the accompanying drawings, which form a part of the specification.

The object of this invention is to provide a device to prevent automobiles and vehicles of this class from skidding and to protect the tires thereof from wear. I attain these objects by means of an attachment composed of a series of metal calks connected together with links in the novel manner shown in Figures 1 and 2 of the drawings, the whole forming a metal covering fitting over the tread part of the tire, which adjusts itself to the contour and responds to the resiliency thereof; is connected with and held in place by two metal hoops, one on either side of the tire; said hoops being provided with adjusters to increase or decrease the circumference thereof and hold the attachment in place. Tightening the adjusters spreads the calks laterally and tightens them around the circumference of the tire.

Figure 1:
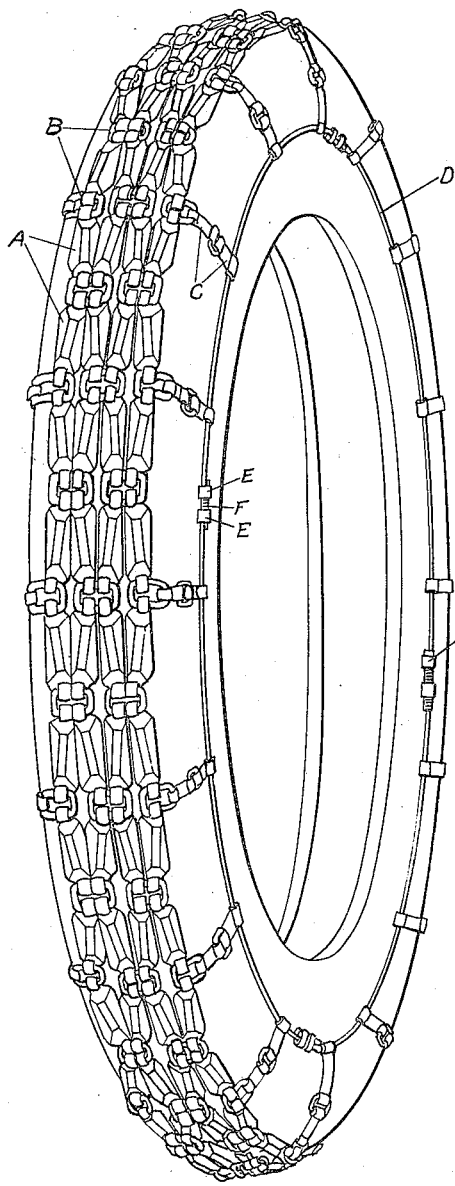
Figure 2:
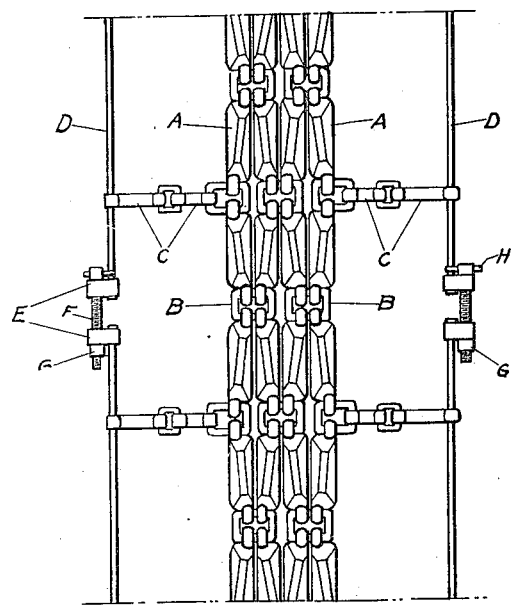
Figures 3, 4:
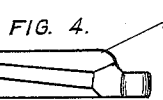
Figures 5, 6, 7, 8:
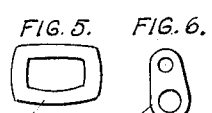
Figures 9, 10:
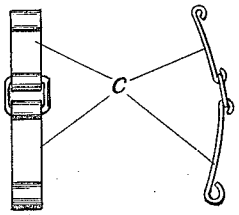

Fig. 1 of the drawings shows a perspective view of a section of the attachment in place over an automobile tire. Fig. 2 shows a section of the attachment spread out flat, showing to better advantage the hoops, adjusters and side connections. Figs. 3 and 4 are detail views of a calk A. Fig. 5 is a detail view of a link B. Figs. 6 and 8 are two views of the lug E to the hoop adjuster. Fig. 7 is a view of the bolt F to the hoop adjuster, and Figs. 9 and 10 are views of the side connection with the hoop D.

The calks A extend parallel with the tread of the tire and are arranged in sections of 8 calks to the section, divided into two groups of 4 calks each extending across the tread of the tire. In the center of the section the 8 calks are connected to 2 links B, 4 calks to each link. At the end of the section and where it connects with the next section there are 8 calks connected to 3 links, 4 calks to the center link and 2 calks to each outside link. This order is maintained entirely around the circumference of the tire. At each point where the sections come together and there are 3 links B in line laterally across the tread of the tire, a side strap C connects the outside link B with the hoop D. The hoops D are provided with adjusters which comprise in their construction two lugs E E which are attached to the ends of the hoop wire D, a bolt F working through the lugs, a nut G and a key H through the head of the bolt F. This key H, which is shown to better advantage in Fig. 7, comes in contact with the hoop D, and prevents the bolt F from turning after it is adjusted. The shoulders of the nut G also come in contact with the hoop D, which holds the nut from turning, so that the adjuster is locked at both ends.

I claim:—

1. A non-skid tire protector comprising a series of calks arranged in pairs side by side, said pairs being connected end to end circumferentially around said tire tread, certain of said connections connecting together all four of the adjacent ends of two pairs of said calks, whereby to prevent both circumferential and lateral separation, and certain of said connections connecting the adjacent ends of the corresponding side calks, whereby to permit certain lateral spreading apart of said calks, and means for securing said protector around said tire.

2. A non-skid tire protector comprising a series of calks arranged in pairs side by side, said pairs being connected end to end circumferentially around said tire tread, all four of the adjacent ends of two pairs of said calks being connected to a single link to prevent both circumferential and lateral separation thereof, and the opposite ends of said calks being connected to the adjacent ends of corresponding calks with independent links, whereby to permit certain lateral spreading of said connected calks, and means for securing said protector around said tire.

3. In a tire protector of the character referred to, a series of calks arranged in groups of four abreast transversely of the tire tread, said groups being connected end to end circumferentially of said tire, the two middle calks of each group being connected at one end to the ends of the two middle calks next adjacent, with the corresponding ends of the outside calks of said group connected to the ends of the adjacent outside calks, while at their opposite ends said calks are connected two and two to the corresponding calks next adjacent, whereby at alternate connections circumferentially of said tire, said connected outside calks can be drawn laterally to increase the tension, substantially as described.

ALBERT GOODALL.

Witnesses:
H. H. STAUB,
WM. BLACK.

Copies of this patent may be obtained for five cents each, by addressing the "Commissioner of Patents, Washington, D. C."